May 7, 1968     E. L. HENDEY     3,381,706
ROLL-ON GATE VALVE
Filed June 24, 1964
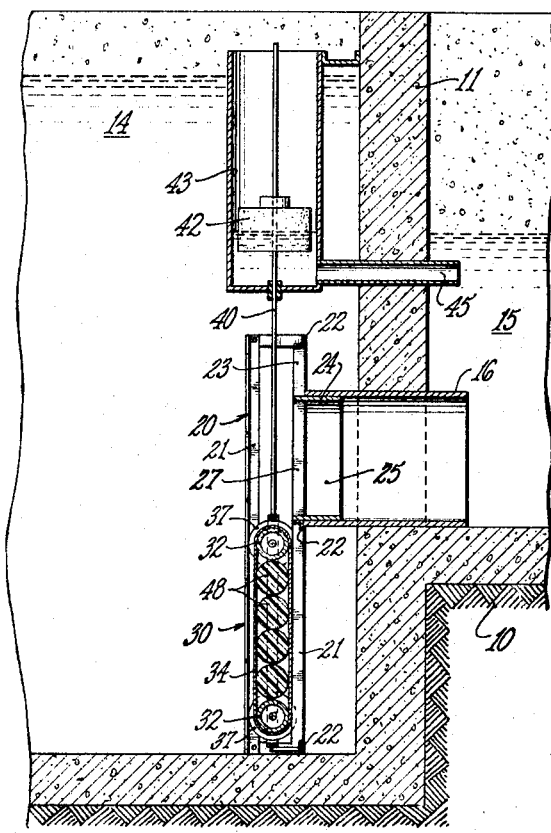
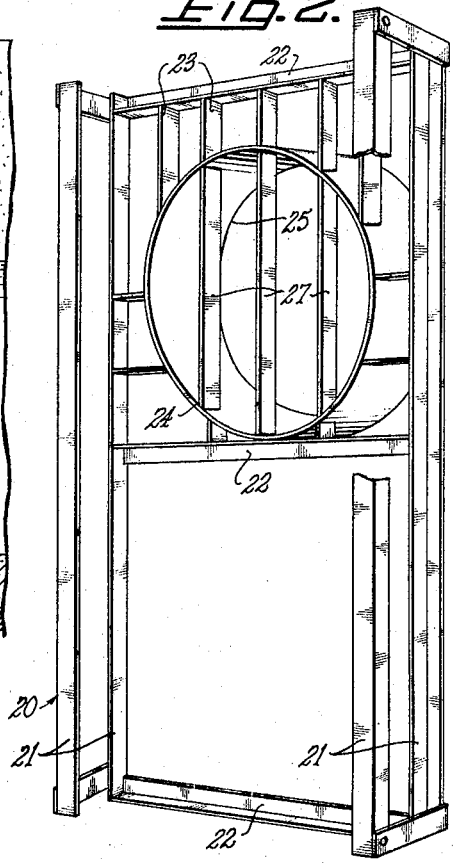
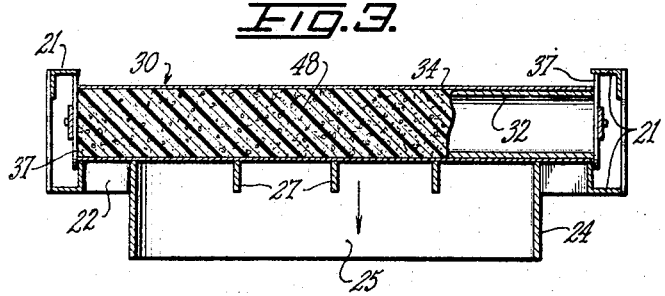
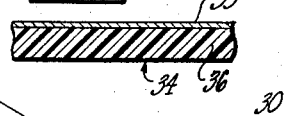
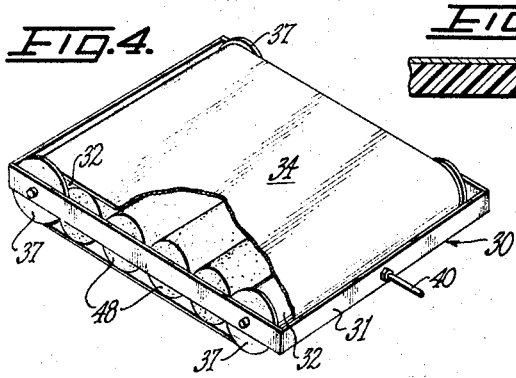
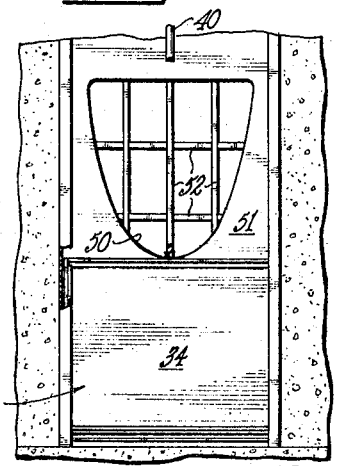
INVENTOR.
EDWARD L. HENDEY
BY
*Knight & Rodgers*
ATTORNEYS

United States Patent Office 3,381,706
Patented May 7, 1968

3,381,706
ROLL-ON GATE VALVE
Edward L. Hendey, 558 Pendleton St.,
Banning, Calif. 92220
Filed June 24, 1964, Ser. No. 377,617
5 Claims. (Cl. 137—423)

The present invention relates generally to fluid flow control mechanisms, such as valves and gates; but it is more especially concerned with a novel construction of a roll-type gate valve particularly designed for large conduits, such as those found in irrigation systems. Since the invention has been particularly designed and developed with a view to its use in irrigation systems, it will be illustrated and described in that connection, but it will be understood that the invention is not necessarily limited thereto since it can be embodied in mechanisms adapted to control the flow of other liquids as well as gases.

It is an object of the present invention to eliminate sliding friction which characterizes many types of fluid flow control devices, as, for example, those in which a plate moves in a linear path across a discharge opening. The sliding friction causes wear of the parts which ultimately results in leakage of the fluid, to obvious disadvantage. Elimination of the sliding friction not only produces a device having a longer useful life but one which is much easier to operate since power is not required to overcome the friction of the movable parts.

Another object of the present invention is to provide a flow control device which is not subject to vibration of the movable valve or flow control member. Again referring to devices in which a plate slides transversely across a discharge opening, devices of this type are often subject to substantial vibration caused by the turbulent flow of the liquid passing them. The vibration causes the movable member to hammer the seats or supporting surfaces, with the result that clearances are enlarged and leaks develop. This is obviously a vicious circle since as clearances increase, the amplitude of the vibration increases and so the damage from vibration becomes greater.

A further object of the invention is to provide a flow control device which is not subject to leakage induced by wear of the moving parts.

Another object of the invention is to provide a flow control device having a movable member which, when submerged in the fluid, can be designed with a substantial degree of buoyancy that decreases its effective weight. As a consequence, the movable valve member is much easier to operate, especially to raise and lower. This makes possible a smaller and less expensive operating gear, whether operation be by hand or by power.

It is also an object of the present invention to provide a flow control device of novel construction which is economical to manufacture and to install and which reduces to a minimum maintenance and repair costs.

These objects of the invention are achieved by providing a fluid flow control device suitable for operation in conjunction with a fluid duct having an orifice surrounded by a surface lying substantially in a single plane, by providing a carriage, a pair of spaced, parallel rolls rotatably mounted on the carriage, and a fluid impervious, endless, flexible belt passing around the two rolls to bring the outer surface of the belt into said common plane and into engagement with the surface around the discharge orifice. Means are provided to move the carriage linearly in a direction parallel to the plane of the surface, thereby rolling the belt over said surrounding surface and across the orifice to cover or uncover the discharge orifice as may be desired. Buoyancy modifying means may be embodied in the device by making the rolls hollow and buoyant, and also by adding one or more floats in the space between the runs of the belt, thus giving to the movable member a buoyancy which can be controlled in amount to reduce the net effective weight to any desired low value.

How the above objects and advantages of the present invention, as well as others not specifically referred to herein, are attained will be more readily understood by reference to the following description and to the annexed drawing, in which:

FIG. 1 is a vertical section through a flow control device embodying the present invention, illustrating an installation as an irrigation head gate.

FIG. 2 is a perspective of the upstream side of the guide frame.

FIG. 3 is a horizontal transverse section through the guide frame on line 3—3 of FIG. 2, with the gate in place over the orifice.

FIG. 4 is a perspective view of the gate alone removed from the frame.

FIG. 5 is an enlarged fragmentary section through the endless belt.

FIG. 6 is an elevational view of a different embodiment of the orifice.

Referring now to the drawing, and more particularly to FIG. 1, there is shown therein flow regulating means embodying the present invention installed in a typical manner as a head gate in an irrigation system. The water is shown flowing in an open ditch 10 having a transversely extending wall or dam 11 which separates upstream body of water 14 from downstream body of water 15. Flow from the upstream side of dam 11 to the downstream side is through conduit 16 which is representative of any type of conduit or pipe through which fluid flow is to be controlled. Conduit 16 is circular in cross-section for practical reasons; but it will be realized that this shape of duct is not limitative upon the invention.

The means controlling flow through duct 16 is located upstream therefrom, that is, at the left-hand side of dam 11. This means includes roller gate 30 and a guide frame 20 therefor which is shown in greater detail in FIG. 2. Frame 20 comprises a pair of laterally spaced, vertically extending parallel guides 21 which are rigidly interconnected by a plurality of transverse members 22. These guides control and guide the travel of the gate 30 hereinafter described. Frame 20 also includes annular coupling 24 which is rigidly connected to guides 21 and members 22 by braces 23 and which serves as a means for connecting the frame and the gate carried thereby to conduit 16 in a predetermined relationship and for maintaining that relationship. However, as will become apparent from later description, the coupling may be dispensed with as a separate member. Accordingly, a full understanding of the invention will be facilitated if the annular member 24 is considered to be a terminal portion of the duct through which water is discharged, moving from left to right in FIG. 1.

Viewed in this light, annular member 24 becomes a peripheral wall surrounding a discharge orifice 25; and the upstream end of coupling 24 provides an annular surface around discharge orifice 25 lying in a vertical plane, as may be seen in FIGS. 1 and 3. Extending across orifice 25 within coupling 24 are a plurality of rigid bars 27. The size, location and number of these bars are determined by various considerations; but it will be seen that the upstream edge surfaces of all these bars lie in the vertical plane containing the upstream surface of coupling 24 since these bars constitute a grid supporting the gate within the area of orifice 25 against upstream water pressure.

The roller gate indicated generally at 30 comprises a generally rectangular, open carriage 31 on which is rotatably mounted a pair of spaced, parallel rolls 32. These rolls normally turn about horizontal axes since, as will become evident, the movement of the gate is typically vertical; but the gate may move in an inclined plane. Trained around the two rolls 32 is an endless belt 34 which is sufficiently flexible that it can bend to the radius of rolls 32. Of course, the diameter of the rolls is selected with the flexibility of the belt in mind.

Rolls 32 are preferably of equal diameter, as shown, though this is not necessary. This makes the two runs of the belt parallel to each other. Again, the invention in not so limited. However, one run of the belt is straight to provide a flat outer surface of the belt for engagement with supporting and sealing surfaces disposed in the plane of the end surface of coupling 24.

Belt 34 may be of any suitable construction, as, for example, a rubberized fabric. However, in a preferred embodiment, it is a composite member comprising a relatively thin layer 35 of sheet metal and a thicker layer 36 of a stiff but yielding, resilient plastic, as may be seen in FIG. 5. The metal layer gives to the gate a high tensile strength which is advantageous for obvious reasons, as well as giving to the belt dimensional stability which enables it to cooperate more effectively with the engaging surfaces on coupling 24 and grid bars 27. The metal chosen is preferably one which does not react with the fluid with which it comes in contact. For this purpose, stainless steel is often satisfactory; but under some circumstances even stainless steel reacts with dissolved constituents in the water, and then the metal layer is preferably titanium or other comparatively inert metal.

The plastic layer 36 is firmly bonded to the metal layer. It provides a yielding, elastic surface on one side of the gate to engage the supporting surfaces on coupling 24 and grid bars 27, producing a fluid-tight seal with these members. For this purpose, a chemically inactive material is chosen, such as polyethylene or rubber.

The ends of rolls 32 are preferably provided at their ends with flanges 37 of greater diameter than the intervening portion of the rolls, these flanges 37 engaging guide rails 21 to restrain the gate against horizontal motion away from the orifice defined by coupling 24, while allowing freedom of vertical movement of the gate parallel to guides 21. The gate is moved up and down, moving relative to the guide frame, by operating rod 40. As is common practice in the industry and sufficiently well known to need no further illustration, operating rod 40 normally extends up to a suitable type of operator, such as a rack and pinion or other usual means which can be operated either manually or by an electric motor. The latter is preferred where operation is controlled from a remote point. Such an operator is designed to move control rod 40 longitudinally to raise and lower gate 30.

However, advantage may be taken of novel features of the present invention to raise and lower gate 30 by other control means, if desired. Such control means may be float 42 within float chamber 43 which is in free communication through pipe 45 with the downstream water body 15. Thus the water level in chamber 43 corresponds to the level of the downstream body 15 and as the water level rises in chamber 43, float 42 has sufficient buoyancy to rise with the water level and thereby to raise gate 30. Conversely, the gate drops as the water level in chamber 43 drops. It will be obvious that the gate can also be designed to open on a rising head of water by the simple expedient of having the gate close the orifice at the lower end of its range of travel. Also the upstream water level may be used to control the float position, by eliminating pipe 45 and opening chamber 43 to the upstream water body 14.

To make possible this type of automatic control, the roller gate is provided with buoyancy modifyng means designed to give sufficient buoyancy to the submerged gate that the effective net weight of the gate is reduced to a desirably low value. Such buoyancy modifying means may take either or both of two different forms. The first form consists of cylinders 32 themselves, which may be made water tight and hollow as shown in FIGS. 1 and 3 so that rolls 32 provide a substantial amount of buoyancy or lift on the gate. If this is considered insufficient, additional buoyancy may be provided by providing one or more floats 48 in the space between the two parallel runs of the belt. These floats preferably take the form of cylindrical elements of the same length as rolls 32 and preferably of no greater diameter. These floats may be hollow metal cylinders or they may be closed cell plastic foam or any other suitable type of low density material.

By proper design of the means just described, the buoyancy of the gate can be so adjusted that its net effective weight, even for a relatively large gate, is just a few pounds. In some cases, it will also be possible to give it a net buoyancy or lift, if desired. As long as the gate is fully submerged, its buoyancy, or net weight, is constant.

As the gate is raised and lowered by means of rod 40, the endless flexible belt moves around rolls 32 which revolve in carriage 31. This action causes belt 34 to have a rolling action relative to the end surface of coupling 24 and grid bars 27 as it moves across orifice 25. Since the upstream water pressure is normally greater than the downstream pressure, this differential pressure is exerted in a direction to press the belt into engagement with the end surface of coupling 24 and grid bars 27. Contact with the entire wall of coupling 24 effects a water-tight seal completely around orifice 25 and shuts off all flow through the orifice when it is fully covered by belt 34.

One run of belt 34 is always subjected to the same water pressure on both sides, while the other run closing the discharge duct has a higher pressure on the upstream side over the portion of the belt within the perimeter of the orifice. The pressure differential forces the belt into sealing relation with the rim of coupling 24. In addition, it is supported as may be needed by grid 27 and the outside bars 23, the amount and placement of the support being a function of the pressure differential, among other factors. It will be noted that as the gate moves from open to closed position, it has substantially no movement in opposition to water pressure or frictional forces, hence it can be moved with a minimum operating force.

Alternatively, the gate can be raised above the discharge orifice to open it, in which case frame 20 is turned end-for-end from the position of FIG. 1. In the position shown, it rests on the concrete base of the ditch or the like, but this is not necessary as the frame may be supported from the face of dam 11.

The rolling action of belt 34 as it moves onto and off of the supporting surface is to effect an opening and closing of the discharge orifice without any relative movement between the belt and the supporting surfaces. This lack of relative movement substantially eliminates all friction between the belt and the surfaces it engages and, accordingly, minimizes wear of the belt at points of contact with the stationary elements of the structure. The only force required to move the gate is that required to turn rolls 32 and revolve the belt within the frame.

Various modifications in the arrangement of the discharge orifice, as well as other parts of the supporting structure, are possible. One such modification is shown in FIG. 6 in which discharge orifice 50 is located in metal plate 51, the face of plate 51 providing the planar surface surrounding the discharge orifice. Within the orifice is a grid of bars 52 designed to support the gate against the upstream water pressure.

In this embodiment of the invention, orifice 50 has the side and bottom walls shaped to conform to a parabola with its major axis vertical. This shape of curve is adopted in order to obtain a linear relation between the increase in rate of fluid discharged through the orifice and the downward movement of the gate to open the orifice to fluid flow. Gate 30 and guide frame 20 may be constructed in the same manner as previously described.

Another modification is possible to make the gate valve adapted to control reverse or bi-directional flow in a conduit. This arrangement will be evident from the above description as it involves merely placing a second orifice and grid at the opposite side of the gate when it is engaged by the other run of the belt. Hence both runs of the belts then serve as closures for an orifice and a pressure differential in either direction presses one of the belts against an orifice to close it.

From the foregoing description, it will be apparent that various changes in the details of construction and design of my improved flow control means may be made by persons skilled in the art without departing from the spirit and scope of the present invention. Accordingly, it is to be understood that the foregoing description is considered to be illustrative of, rather than limitative upon, the invention as defined by the appended claims.

I claim.

1. A gate valve comprising in combination:
   a fluid duct having an inlet orifice surrounded on the upstream side thereof by a surface lying substantially in a single plane;
   a carriage movable relative to the orifice;
   a pair of spaced parallel rolls rotatably mounted on the carriage;
   an extended surface, fluid impervious, endless, flexible belt upstream from said orifice and passing around the rolls, a surface on one run of the belt lying substantially in said plane and sealingly engageable with the first mentioned surface in response to fluid pressure exerted over an extended surface on the one run of the belt by fluid upstream from said orifice and said belt;
   means for positively positioning the carriage and belt relative to the orifice to regulate fluid flow through the orifice;
   and means for guiding said carriage in a direction parallel to said plane to roll the belt over the surface and across the orifice to cover or uncover the orifice.

2. A gate valve comprising the combination as in claim 1 in which the endless belt is a composite member comprising a thin layer of sheet metal and a layer of a yielding, elastic material on at least the outwardly facing side of the belt.

3. A gate valve comprising the combination as in claim 1 which also includes a grid within the duct orifice, surfaces on the grid lying substantially in said plane to engage and support the endless belt within the area of the orifice.

4. A gate valve comprising the combination as in claim 1 which also includes buoyancy modifying means disposed between the runs of the endless belt.

5. A gate valve comprising the combination as in claim 4 in which the buoyancy modifying means comprises a plurality of cylindrical elements.

References Cited
UNITED STATES PATENTS

| | | | |
|---|---|---|---|
| 1,666,908 | 4/1928 | Moore. | |
| 2,150,359 | 3/1939 | Brown | 137—429 X |
| 2,752,280 | 6/1956 | Cooke et al. | 161—221 X |
| 1,998,830 | 4/1935 | Beebe | 251—355 X |
| 3,212,268 | 10/1965 | Ortega | 137—429 X |

WILLIAM F. O'DEA, *Primary Examiner.*

D. R. MATTHEWS, *Assistant Examiner.*